(12) United States Patent
Zhou et al.

(10) Patent No.: US 12,142,171 B2
(45) Date of Patent: Nov. 12, 2024

(54) DISPLAY DEVICE AND DRIVING METHOD THEREFOR

(71) Applicant: BOE Technology Group Co., Ltd., Beijing (CN)

(72) Inventors: Chunmiao Zhou, Beijing (CN); Tao Hong, Beijing (CN); Kuanjun Peng, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/252,341

(22) PCT Filed: Dec. 21, 2020

(86) PCT No.: PCT/CN2020/138102
§ 371 (c)(1),
(2) Date: May 9, 2023

(87) PCT Pub. No.: WO2022/133681
PCT Pub. Date: Jun. 30, 2022

(65) Prior Publication Data
US 2024/0005826 A1   Jan. 4, 2024

(51) Int. Cl.
*G09G 3/00*   (2006.01)
*G02B 30/27*   (2020.01)
(Continued)

(52) U.S. Cl.
CPC ............. *G09G 3/003* (2013.01); *G02B 30/27* (2020.01); *G06F 3/013* (2013.01); *G09G 3/2074* (2013.01);
(Continued)

(58) Field of Classification Search
CPC ................ G09G 3/003; G09G 3/2074; G09G 2320/0209; G09G 2320/028;
(Continued)

(56) References Cited

U.S. PATENT DOCUMENTS

2013/0088486 A1*   4/2013   Yoon ................... H04N 13/366
                                                                345/419
2013/0176203 A1    7/2013   Yun et al.
(Continued)

FOREIGN PATENT DOCUMENTS

CN       103364959 A      10/2013
CN       104777615 A      7/2015
(Continued)

OTHER PUBLICATIONS

International Search Report and Written Opinion, mailed Sep. 23, 2021, from PCT/CN2020/138102, 14 pages.
(Continued)

*Primary Examiner* — Brent D Castiaux
(74) *Attorney, Agent, or Firm* — Workman Nydegger (57) ABSTRACT

Provided are a display device and a driving method therefor. Each pixel island in a display panel is divided into a plurality of sub-pixel subdivision units, different monocular viewpoint images are formed by rendering different grayscales for different sub-pixel subdivision units, and a main lobe angle of each lens is adjusted to satisfy that the monocular viewpoint images displayed by the sub-pixel subdivision units in a pixel island are projected to a corresponding independent visible region respectively through different lenses to form a viewpoint, so as to satisfy conditions for achieving super-multi-viewpoint 3D display.

20 Claims, 8 Drawing Sheets

(51) Int. Cl.
*G06F 3/01* (2006.01)
*G09G 3/20* (2006.01)

(52) U.S. Cl.
CPC .............. *G09G 2320/0209* (2013.01); *G09G 2320/028* (2013.01); *G09G 2354/00* (2013.01)

(58) Field of Classification Search
CPC .... G09G 2354/00; G02B 30/27; G06F 3/013; H04N 13/305; H04N 13/366
See application file for complete search history.

(56) References Cited

U.S. PATENT DOCUMENTS

| | | |
|---|---|---|
| 2013/0258461 A1 | 10/2013 | Sato et al. |
| 2019/0124324 A1 | 4/2019 | Allio et al. |
| 2022/0311991 A1 | 9/2022 | Hong |
| 2022/0366819 A1 | 11/2022 | Gao et al. |
| 2022/0377311 A1 | 11/2022 | Gao et al. |
| 2022/0394236 A1 | 12/2022 | Gao |

FOREIGN PATENT DOCUMENTS

| | | | | |
|---|---|---|---|---|
| CN | 107885325 A | 4/2018 | | |
| CN | 207440472 U | 6/2018 | | |
| CN | 108563028 A | 9/2018 | | |
| CN | 110471190 A | * 11/2019 | ............. | H04N 13/30 |
| CN | 110632767 A | 12/2019 | | |
| CN | 111095080 A | 5/2020 | | |
| CN | 111552093 A | 8/2020 | | |
| CN | 111624784 A | 9/2020 | | |
| CN | 111766716 A | 10/2020 | | |
| JP | 2016029419 A | 3/2016 | | |
| KR | 101335334 B1 | 12/2013 | | |
| KR | 20170080849 A | 7/2017 | | |

OTHER PUBLICATIONS

Chinese First Office Action, mailed Mar. 3, 2023, from Chinese App. No. 202080003471.1, 14 pages.

* cited by examiner

DISPLAY DEVICE AND DRIVING METHOD THEREFOR

CROSS REFERENCE TO RELATED APPLICATIONS

The present disclosure is a US National Stage of International Application No. PCT/CN2020/138102, filed on Dec. 21, 2020, the entire contents of which are incorporated herein by reference.

FIELD

The present disclosure relates to the technical field of three-dimensional display, and in particular to a display device and a driving method therefor.

BACKGROUND

Based on binocular parallax, a naked-eye three-dimensional (3D) display technology can generate realistic and stereoscopic images having a sense of space and depth without any auxiliary tools (such as 3D glasses). Since the stereoscopic images feature realistic and vivid expression, superior environmental appeal and powerful visual impact, the naked-eye 3D display device has been applied to increasing domains.

SUMMARY

An embodiment of the present disclosure provides a display device, including: a display panel including a plurality of pixel islands, where each of the pixel islands includes a plurality of sub-pixels arranged in an array, the plurality of sub-pixels in each of the pixel islands are divided into a plurality of sub-pixel subdivision units arranged in a row direction, each of the sub-pixel subdivision units is configured to display a monocular view image, and the sub-pixel subdivision units in one pixel island are configured to alternately display a left eye view image and a right eye view image in the row direction; and a light splitting device on a side of a display surface of the display panel, and including a plurality of lenses arranged in an array, where one pixel island corresponds to one lens, a main lobe angle of each of the lenses satisfies that monocular view images displayed by the sub-pixel subdivision units in one pixel island are projected onto a corresponding independent visible region by means of different lenses, to form a view separately, the number of views included in one independent visible region is not less than 2, and a width of each view in the row direction formed by projecting the monocular view image displayed by each of the sub-pixel subdivision units onto the independent visible region by means of the lens is less than a monocular pupil diameter.

In a possible implementation mode, in the display device according to the embodiment of the present disclosure, the lenses are columnar lenses, and a diameter of one lens is less than a width of one pixel island in the row direction; and a central point of the pixel island at a central position of the display panel and a central point of the corresponding lens coincide with each other, and the lenses of the light splitting device are arranged closely.

In a possible implementation mode, in the display device according to the embodiment of the present disclosure, the diameter P of each of the lenses and the width D of the pixel island in the row direction satisfy the following relation:

$$\frac{P}{D} = \frac{L}{L+H}.$$

L represents a distance between the independent visible region and the light splitting device, and H represents a distance between the pixel island and the lens.

In a possible implementation mode, in the display device according to the embodiment of the present disclosure, the width of each view in the row direction formed by projecting the monocular view image displayed by each of the sub-pixel subdivision units onto the independent visible region by means of the lens is less than or equal to 3.2 mm, and a curvature radius of each of the lenses ranges from 1.86 mm to 2.02 mm.

In a possible implementation mode, in the display device according to the embodiment of the present disclosure, the left eye view image and the right eye view image displayed by two sub-pixel subdivision units respectively are projected onto two independent visible regions respectively where a left eye and a right eye of a viewer are located by means of adjacent lenses.

In a possible implementation mode, in the display device according to the embodiment of the present disclosure, the left eye view image and the right eye view image displayed by two sub-pixel subdivision units respectively are projected onto two independent visible regions respectively where a left eye and a right eye of a viewer are located by means of two lenses separated by n lenses, and n is greater than or equal to 1 and is an integer.

In a possible implementation mode, in the display device according to the embodiment of the present disclosure, a width Q of the independent visible region in the row direction and a pupil distance E between the left eye and the right eye of the viewer satisfy the following relation:

$$Q = \frac{E}{2n+1}.$$

Q≥8 mm, n represents the number of lenses separating the two lenses through which the left eye view image and the right eye view image displayed by the two sub-pixel subdivision units respectively are projected onto the left eye and the right eye of the viewer respectively, and E has a value range of 58 mm-78 mm.

In a possible implementation mode, in the display device according to the embodiment of the present disclosure, the number k of the sub-pixel subdivision units in one pixel island and the width Q of the independent visible region in the row direction satisfy the following relation:

$$Q = k\frac{e}{2m}.$$

m represents the number of views included in one independent visible region, m≥2; and e represents the monocular pupil diameter, and has a value range of 3 mm-5 mm.

In a possible implementation mode, the display device according to the embodiment of the present disclosure further includes: an eye tracker configured to determine whether a viewing region where the left eye and the right eye are located is located in a central region of the display panel; and an image processor configured to switch the pixel islands of the display panel to display a light field image in response to that the viewing region where the left eye and the right eye are located is located in the central region of the display panel, and to switch the pixel islands of the display panel to display a super multi-view three-dimensional image in response to that the viewing region where the left eye and the right eye are located is located in an edge region of the display panel.

In a possible implementation mode, in the display device according to the embodiment of the present disclosure, the image processor is specifically configured to control, in response to that the viewing region where the left eye and the right eye are located is located in the edge region of the display panel, sub-pixel subdivision units corresponding to views in the two independent visible regions where the left eye and the right eye of the viewer are located to display the left eye view image and the right eye view image respectively, and to control remaining sub-pixel subdivision units to display a black gray scale image.

In a possible implementation mode, in the display device according to the embodiment of the present disclosure, the eye tracker is specifically configured to determine whether the viewing region where the left eye and the right eye are located is located in a space in which an included angle between the viewing region and a center line of the display panel is within 15°.

In a possible implementation mode, in the display device according to the embodiment of the present disclosure, the eye tracker includes a camera below the central region of the display panel.

In the other aspect, an embodiment of the present disclosure further provides a driving method for the above display device. The driving method includes: determining whether a viewing region where a left eye and a right eye are located is located in a central region of a display panel; switching pixel islands of the display panel to display a light field image in response to that the viewing region where the left eye and the right eye are located is located in the central region of the display panel; and switching the pixel islands of the display panel to display a super multi-view three-dimensional image in response to that the viewing region where the left eye and the right eye are located is located in an edge region of the display panel.

In a possible implementation mode, in the driving method according to the embodiment of the present disclosure, in response to that the viewing region where the left eye and the right eye are located is located in the edge region of the display panel, the method specifically includes: controlling sub-pixel subdivision units corresponding to views in two independent visible regions where the left eye and the right eye of the viewer are located to display a left eye view image and a right eye view image respectively, and controlling remaining sub-pixel subdivision units to display a black gray scale image.

In a possible implementation mode, in the driving method according to the embodiment of the present disclosure, the determining whether the viewing region where the left eye and the right eye are located is located in the central region of the display panel specifically includes: determining whether the viewing region where the left eye and the right eye are located is located in a space in which an included angle between the viewing region and a center line of the display panel is within 15°.

DETAILED DESCRIPTION OF THE EMBODIMENTS

A development goal of a naked-eye three-dimensional (3D) display technology is to pursue a naturally comfortable and impressive stereoscopic display effect and present a real stereoscopic scene. However, limited to the capabilities of display devices and optical devices, the current naked-eye 3D display allows no free moving and viewing and has a limited viewing range. Especially in a light field display mode, both a viewing region and a viewing range are small. Particularly for medium-and-large-sized display devices, it is difficult to achieve light field display for close viewing. Besides, a resolution and a view continuity of the naked-eye 3D display restrict each other, and crosstalk between views is severe, such that a monocular 3D view image becomes relatively blurred and has low contrast.

Moreover, the naked-eye 3D display further has a conflict between focus and convergence, and a long-term viewing of the naked-eye 3D display tends to cause discomfort or visual fatigue. In the related art, on one hand, jumps and discontinuities of mobile viewing are alleviated by increasing a concentration of views, so as to achieve natural viewing of a super multi-view naked-eye 3D display, but the quality of 3D view images is poor. On the other hand, in order to solve the conflict between focus and convergence from the root, views obtained by each eye are generally greater than or equal to 2 views, so as to generate a monocular focus adjustable function, which guarantees the consistency of focus and convergence, but a visible range and a visible region are typically small.

In order to enhance a display effect of a super multi-view naked-eye 3D image and further promote application of a light field 3D display, the present disclosure provides a display device capable of implementing 3D switching between a light field display and a super multi-view display. A viewer may view a light field image capable of generating a plurality of depths in a central region, to achieve monocular focus adjustment. The viewer may obtain a super multi-view 3D display with low crosstalk outside the central region, to achieve 3D information reproduction at different angles. The super multi-view display and the light field display are fused, so as to improve the naked-eye 3D display effect and promote the application of the naked-eye 3D display.

In order to make objectives, technical solutions, and advantages of the present disclosure clearer, the present disclosure will be further described below in conjunction with the accompanying drawings in detail. Apparently, the described embodiments are some embodiments rather than all embodiments of the present disclosure. Based on the embodiments of the present disclosure, all other embodiments acquired by those of ordinary skill in the art without making creative efforts fall within the scope of protection of the present disclosure.

Shapes and sizes of components in the accompanying drawings do not reflect true scale, and are merely illustrative of the present disclosure.

Figure 1:
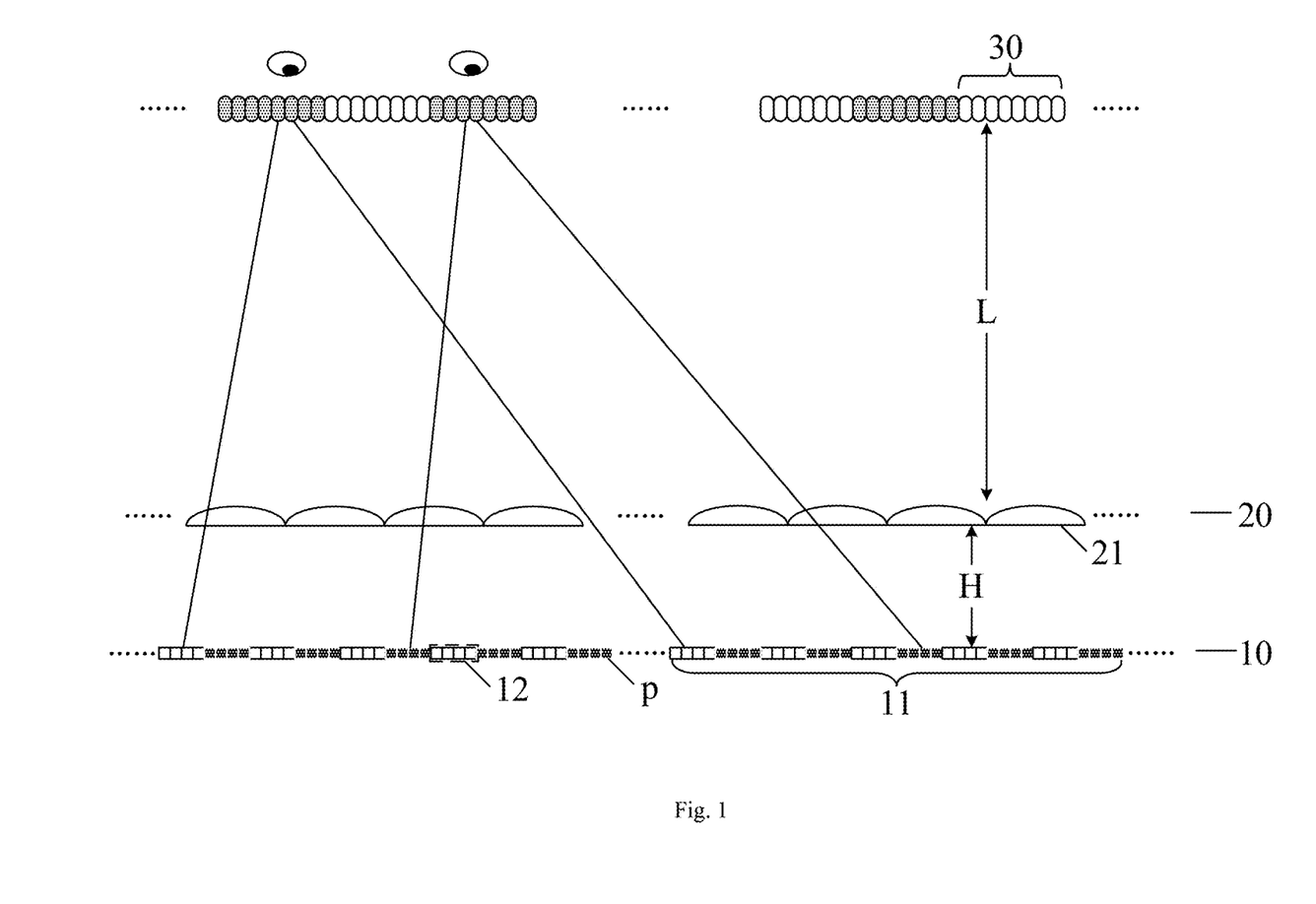
FIG. 1 is a schematic structural diagram of a display device according to an embodiment of the present disclosure.

An embodiment of the present disclosure provides a display device. As shown in FIG. 1, the display device includes: a display panel 10, including a plurality of pixel islands 11 as shown in FIGS. 2 and 3, where each of the pixel islands 11 includes a plurality of sub-pixels p arranged in an array, the sub-pixels p may be arranged in a row direction and a column direction, the plurality of sub-pixels p in each of the pixel islands 11 are divided into a plurality of sub-pixel subdivision units 12 arranged in the row direction, each of the sub-pixel subdivision units 12 is configured to display a monocular view image, and the sub-pixel subdivision units 12 in one pixel island 11 are configured to alternately display a left eye view image and a right eye view image in the row direction; and a light splitting device 20 located on a side of a display surface of the display panel 10, and including a plurality of lenses 21 arranged in an array, where one pixel island 11 corresponds to one lens 21, a main lobe angle of each of the lenses 21 satisfies that the monocular view images displayed by the sub-pixel subdivision units 12 in one pixel island 11 are projected onto a corresponding independent visible region 30 by means of different lenses 21, to form a view separately, the number of views included in one independent visible region 30 is not less than 2, and a width of each view in the row direction formed by projecting the monocular view image displayed by each of the sub-pixel subdivision units 12 onto the independent visible region 30 by means of the lens 21 is less than a monocular pupil diameter e.

Specifically, the embodiment of the present disclosure provides the display device. The sub-pixels in each of the pixel islands 11 in a display panel 10 are grouped into the plurality of sub-pixel subdivision units 12. Different monocular view images are formed by rendering different gray scales of different sub-pixel subdivision units 12, and a main lobe angle of each of the lenses 21 is adjusted to satisfy that the monocular view images displayed by the sub-pixel subdivision units 12 in a pixel island 11 are projected onto a corresponding independent visible region 30 by means of different lenses 21, to form a view separately, such that the display device satisfies conditions for achieving the super multi-view 3D display. The number of views included in one independent visible region 30 is not less than 2, and it is guaranteed that a width of each view formed by projecting the monocular view image displayed by each of the sub-pixel subdivision units 12 onto the independent visible region 30 by means of the lens 21 in the row direction is less than a monocular pupil diameter e, so as to guarantee that the pixel islands 11 may satisfy conditions for achieving the light field display. The display device may switch between light field display and super multi-view three-dimensional display as required, and fuse the super multi-view display and the light field display.

Figure 2:
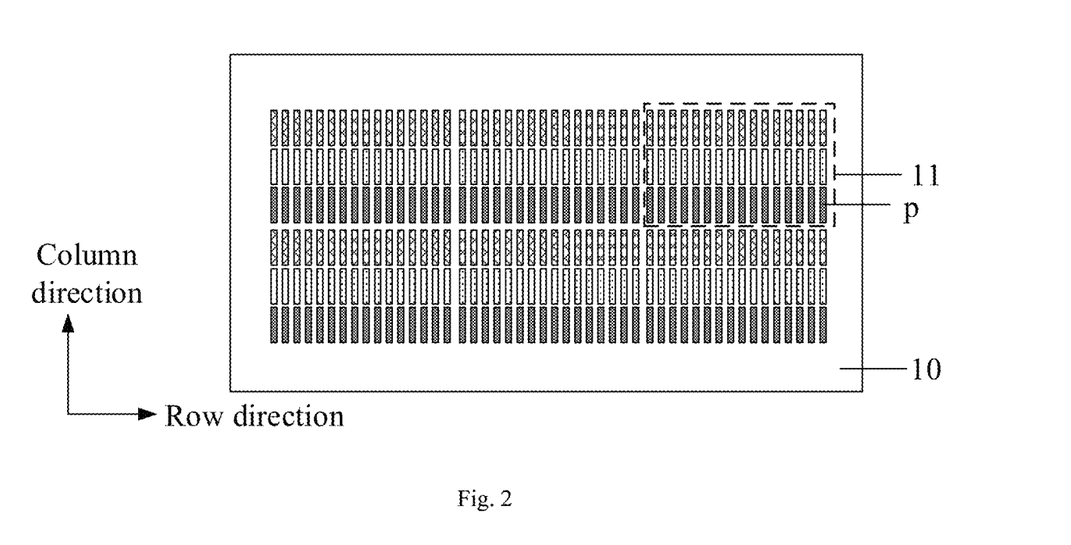
FIG. 2 is a schematic diagram of a plane structure of a display panel of a display device according to an embodiment of the present disclosure.
Figure 3:
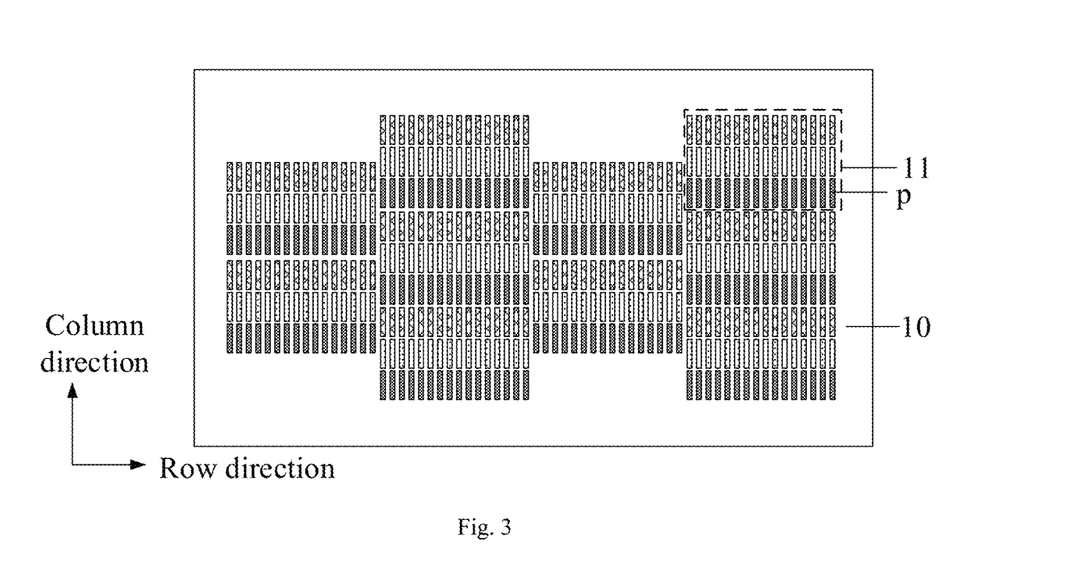
FIG. 3 is a schematic diagram of another plane structure of a display panel of a display device according to an embodiment of the present disclosure.

Specifically, in the above display device provided in the embodiment of the present disclosure, as shown in FIGS. 2 and 3, in one pixel island 11, colors of a row of sub-pixels p arranged in the row direction may be the same, and colors of adjacent sub-pixels p arranged in the column direction may be different from each other. During particular implementation, the pixel islands 11 of the display panel 10 may have the same structure, and the pixel islands 11 may be arranged in an array in the row direction and the column direction. Specifically, the pixel islands 11 of the display panel 10 may be arranged in a manner shown in FIG. 2, that is, rows of pixel islands 11 are aligned in the row direction, and columns of pixel islands 11 are aligned in the column direction, where a line of pixel islands 11 arranged in the row direction may be a row of pixel islands, and a line of pixel islands 11 arranged in the column direction may be a column of pixel islands. Alternatively, the pixel islands 11 of the display panel 10 may be arranged in a manner shown in FIG. 3, that is, pixel islands 11 of a column of pixel islands 11 are aligned in the column direction, and pixel islands 11 of a row of pixel islands 11 are offset in the column direction by a certain distance, for example, the offset distance may be half a width of the pixel islands 11 in the column direction, which is only illustrative of the distance and does not specifically limit the offset distance.

Figure 4:
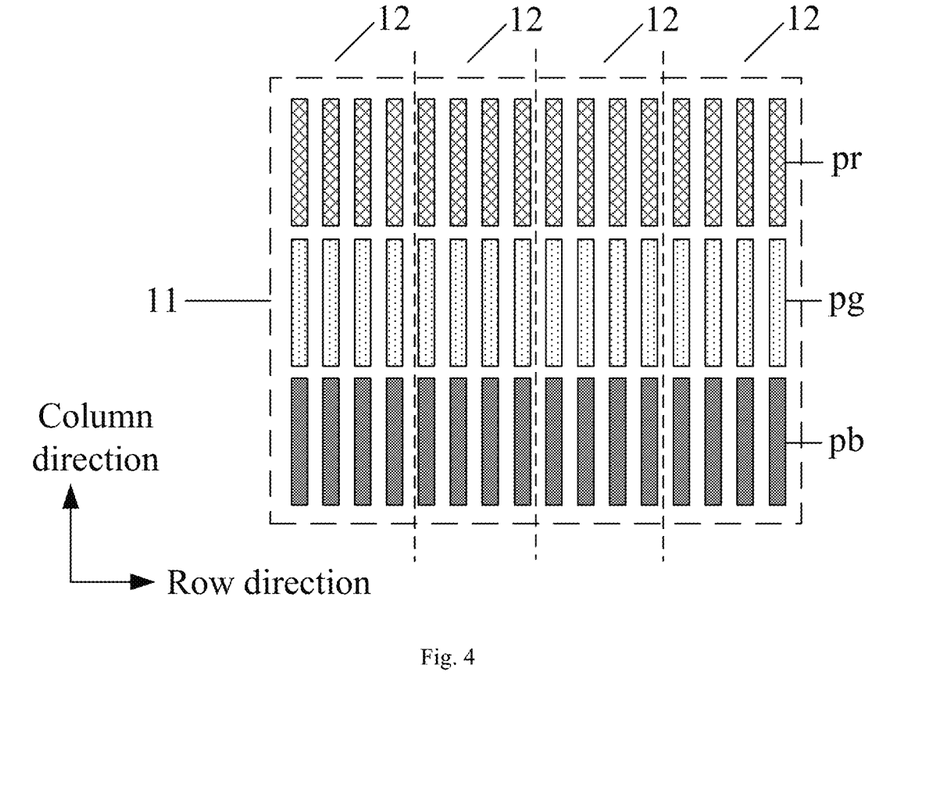
FIG. 4 is a schematic diagram of a pixel island of a display device according to an embodiment of the present disclosure.

Specifically, in the display device provided in the embodiment of the present disclosure, as shown in FIG. 4, one pixel island 11 may include sub-pixels of three primary colors. For example, the pixel island 11 may include red sub-pixels pr, green sub-pixels pg and blue sub-pixels pb. The number of the red sub-pixels pr, the number of the green sub-pixels pg and the number of the blue sub-pixels pb are the same. The red sub-pixels pr are arranged in a row in the row direction, the green sub-pixels pg are arranged in a row in the row direction, and the blue sub-pixels pb are arranged in a row in the row direction. The red sub-pixel row, the green sub-pixel row and the blue sub-pixel row are arranged in the column direction, such that the sub-pixels p in the pixel island 11 are arranged in an array.

During particular implementation, in order to achieve a better three-dimensional display effect, the display panel 10 may be a display panel 10 with a higher resolution. For example, the display panel 10 may be a liquid crystal display panel, an organic electroluminescent display panel or a micro light-emitting diode display panel. Certainly, the display panel may also be a different display panel, which is not limited herein.

Optionally, in the display device provided in the embodiment of the present disclosure, the lenses 21 are columnar lenses, a diameter P of one lens 21 is less than a width D of one pixel island 11 in the row direction. A central point of the pixel island 11 located at a central position of the display panel 10 and a central point of the corresponding lens 21 coincide with each other, and the lenses 21 of the light splitting device 20 are arranged closely. That is, the light splitting device 20 is designed in a shrinkage manner with respect to the display panel 10, so as to enhance an effective visual field of the light field display viewed in the central region.

Specifically, a central axis of each of the columnar lens extends substantially in the column direction, and the central axis may have a certain included angle with the column direction, that is, the columnar lenses are inclined relatively. Since one pixel island 11 corresponds to one lens 21, in order to simplify a manufacturing process of the lenses 21, one columnar lens may be manufactured from one column of columnar lenses. Moreover, since the diameter P of one lens 21 is smaller than the width of one pixel island 11 in the row direction, each of the lenses 21 may have a different amount of shrinkage with respect to the corresponding pixel island 11. Since the central point of the pixel island 11 at the central position of the display panel 10 and the central point of the corresponding lens 21 coincide with each other, there is no amount of shrinkage between the lens 21 at the central position and the corresponding pixel island 11. With the lens 21 corresponding to the pixel island 11 in the central position as a reference, remaining lenses 21 are closely arranged, and then it may be construed as that a lens 21 outermost in the row direction of the light splitting device has a maximum amount of shrinkage with respect to the corresponding pixel island 11.

Optionally, in the display device provided in the embodiment of the present disclosure, a relation between an aperture (that is, diameter) of the lenses 21 and a size of the pixel islands 11 may be adjusted according to a conventional viewing distance of the display device. Specifically, the diameter P of each of the lenses 21 and the width D of the pixel islands 11 in the row direction satisfy the following relation:

$$\frac{P}{D} = \frac{L}{L+H}.$$

L represents a distance between the independent visible region 30 and the light splitting device 20, and H represents a distance between the pixel island 11 and the lens 21. It is to be noted that in the display device provided in the embodiment of the present disclosure, when the lenses 21 are columnar lenses, central axes of the columnar lenses extend in the column direction, and the diameter P of the columnar lenses refers to the width in the row direction.

Specifically, in the display device provided in the embodiment of the present disclosure, a topography or a curvature radius of each of the lenses 21 may be optimally adjusted, to guarantee that a projection width of a light beam of a single view at a viewing distance (that is, in an independent visible region) is less than the monocular pupil diameter e (according to a size of a conventional pupil, e generally has a value range of 3 mm-5 mm) when the lenses 21 fall in a range of the maximum amount of shrinkage and no shrinkage relative to the pixel islands 11, and to guarantee that the number of views projected onto a monocular pupil is greater than or equal to 2 views, so that the light field display may be achieved.

Optionally, in the display device provided in the embodiment of the present disclosure, according to relations between the curvature radii of the lenses 21 and the number of pixel islands 11 as well as shrinkage offsets of the lenses 21 shown in the following table, in order to guarantee that the width of each view in the row direction formed by projecting the monocular view image displayed by each of the sub-pixel subdivision units 12 onto the independent visible region 30 by means of the lens 21 is less than or equal to 3.2 mm, a curvature radius of each of the lenses 21 is 1.86 mm-2.02 mm. Specifically, a maximum offset of a half screen in the following table refers to a distance between an outermost lens and a corresponding outermost pixel island in the row direction, and a minimum offset refers to a distance between a lens closest to a center and a corresponding pixel island in the row direction.

Correspondence table of width of view and value range of curvature radius of lens

| Maximum offset of half screen (mm) | Minimum offset of half screen (mm) | Number of pixel islands of half screen Column number* row number | Curvature radius of lens (mm) |
|---|---|---|---|
| 1.2968 | 0.00094 | 1379*574468 | 2.02 |
| 1.2578 | 0.00094 | 1338*085106 | 2 |
| 1.209 | 0.00094 | 1286*170213 | 1.98 |
| 1.17 | 0.00094 | 1244*680851 | 1.96 |
| 1.1213 | 0.00094 | 1192*87234 | 1.94 |
| 1.0725 | 0.00094 | 1140*957447 | 1.92 |
| 1.0238 | 0.00094 | 1089*148936 | 1.9 |
| 0.9653 | 0.00094 | 1026*914894 | 1.88 |
| 0.9068 | 0.00094 | 964*6808511 | 1.86 |

Optionally, in the display device provided in the embodiment of the present disclosure, by adjusting the main lobe angle of each of the lenses 21, the left eye view image and the right eye view image displayed by two sub-pixel subdivision units 12 respectively may enter two independent visible regions 30 respectively where a left eye and a right eye of a viewer are located by means of different lenses 21.

Optionally, in the display device provided in the embodiment of the present disclosure, the left eye view image and the right eye view image displayed by two sub-pixel subdivision units 12 respectively may be projected onto two independent visible regions 30 where a left eye and a right eye of a viewer are located by means of adjacent lenses 21 respectively.

Optionally, in the display device provided in the embodiment of the present disclosure, the left eye view image and the right eye view image displayed by two sub-pixel subdivision units 12 respectively may be projected onto two independent visible regions 30 respectively where a left eye and a right eye of a viewer are located by means of two lenses 21 separated by n lenses 21, and n is greater than or equal to 1 and is an integer. The particular number n of the lenses for separation may be determined based on the width Q of the independent visible regions 30.

Optionally, in the display device provided in the embodiment of the present disclosure, in order to achieve that at least one person views the light field display, a width Q of the independent visible region 30 in the row direction and a pupil distance E between the left eye and the right eye of the viewer satisfy the following relation:

$$Q = \frac{E}{2n+1}.$$

In order to guarantee that one independent visible region 30 may cover at least a size of the monocular pupil and that a monocular eye has sufficient movement space in the independent visible region 30, Q≥8 mm, n represents the number of lenses 21 separating the two lenses 21 through which the left eye view image and the right eye view image displayed by the two sub-pixel subdivision units 12 respectively are projected onto the left eye and the right eye of the viewer respectively. In order to accommodate viewers with different pupil distances, E generally has a value range of 58 mm-78 mm.

Optionally, in the display device provided in the embodiment of the present disclosure, the number k of the sub-pixel subdivision units 12 in one pixel island 11 and the width Q of the independent visible regions 30 in the row direction satisfy the following relation:

$$Q = k\frac{e}{2m}.$$

m represents the number of views included in one independent visible region 30. In order to guarantee a monocular focus adjustment function and achieve a light field display, m≥2. e represents the monocular pupil diameter, and has a value range of 3 mm-5 mm according to a size of a conventional pupil.

Figure 5:
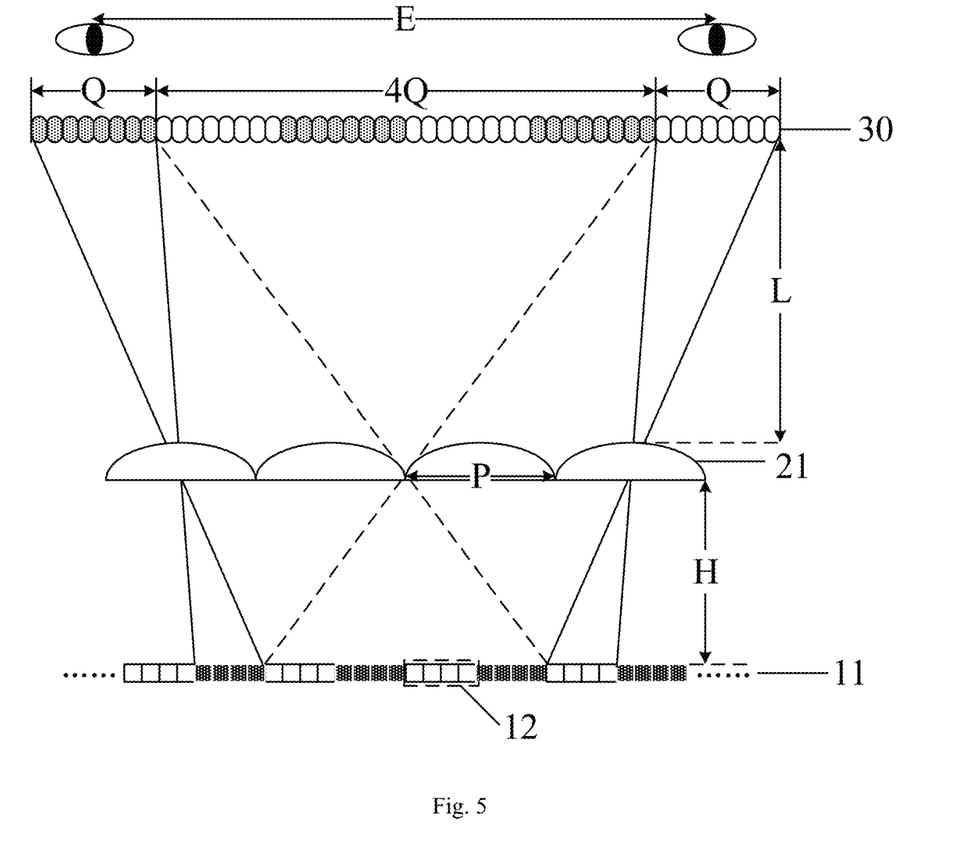
FIG. 5 is a schematic diagram of a relation between an independent visible region and a sub-pixel subdivision unit in a display device according to an embodiment of the present disclosure.

In an embodiment 1, when a monocular pupil of 2 views is used, that is, m=2, and when the number k of sub-pixel subdivision units 12 in a pixel island 11 is 16, that is, all sub-pixels in the pixel island 11 are divided into 16 units. That is, a left eye view image and a right eye view image in the pixel island 11 separately correspond to 8 sub-pixel subdivision units 12, in response to determining that e has a value of 3 mm, Q=12 mm may be computed according to the above formula, that is, the width of an independent visible region 30 in the row direction is 12 mm. In response to determining that E has a value of 60 mm, n=2 may be computed according to the above formula. That is, a left eye view image and a right eye view image displayed by two sub-pixel subdivision units 12 are respectively projected onto independent visible regions 30 where a left eye and a right eye of a corresponding viewer are located by means of two lenses 21 separated by two lenses 21. The two independent visible regions 30 are separated by 4 independent visible regions, the two sub-pixel subdivision units 12 that display the left eye view image and the right eye view image are separated by 4 sub-pixel subdivision units, and particular optical paths are as shown in FIG. 5. Black represents the left eye view image, and white represents the right eye view image.

Figure 6:
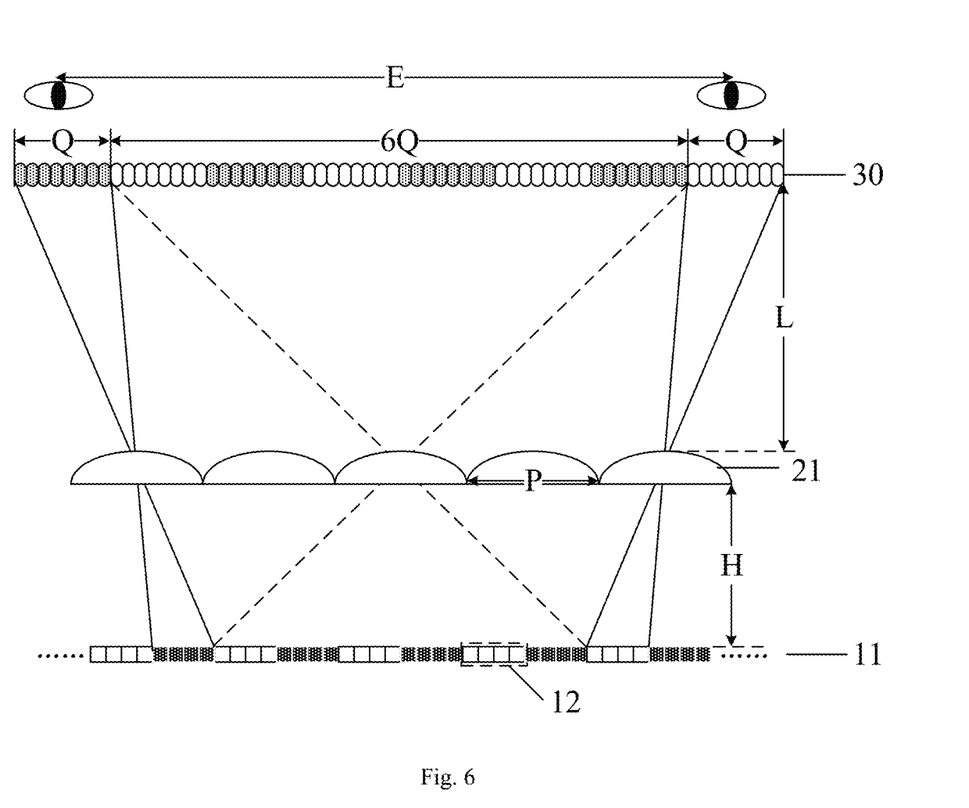
FIG. 6 is a schematic diagram of another relation between an independent visible region and a sub-pixel subdivision unit in a display device according to an embodiment of the present disclosure.

In an embodiment 2, when a monocular pupil of 4 views is used, that is, m=4, and when the number k of sub-pixel subdivision units 12 in a pixel island 11 is 16, that is, all sub-pixels in the pixel island 11 are divided into 16 units, that is, a left eye view image and a right eye view image in the pixel island 11 separately correspond to 8 sub-pixel subdivision units 12, in response to determining that e has a value of 4.5 mm, Q=9 mm may be computed according to the above formula, that is, the width of an independent visible region 30 in the row direction is 9 mm. In response to determining that E has a value of 63 mm, n=3 may be computed according to the above formula. That is, a left eye view image and a right eye view image displayed by two sub-pixel subdivision units 12 are respectively projected onto independent visible regions 30 where a left eye and a right eye of a corresponding viewer are located by means of two lenses 21 separated by three lenses 21. The two independent visible regions 30 are separated by 6 independent visible regions, the two sub-pixel subdivision units 12 that display the left eye view image and the right eye view image are separated by 6 sub-pixel subdivision units, and particular optical paths are as shown in FIG. 6. Dark represents the left eye view image, and white represents the right eye view image.

Figure 7:
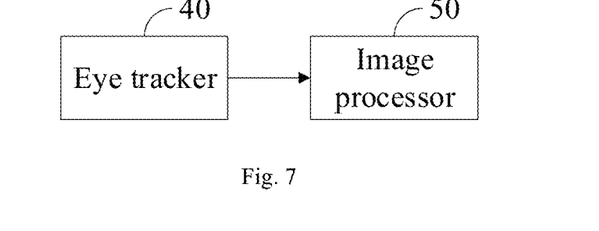
FIG. 7 is another schematic structural diagram of a display device according to an embodiment of the present disclosure.

Optionally, in the display device provided in the embodiment of the present disclosure, in order to adjust an image displayed by the display panel according to a position relation between a viewing region where the left eye and right eye of the viewer are located and the central region of the display panel, the display device, as shown in FIG. 7, may further include: an eye tracker configured to determine whether a viewing region where the left eye and the right eye are located is located in a central region of the display panel; and an image processor 50 configured to switch the pixel islands of the display panel to display a light field image when it is determined that the viewing region where the left eye and the right eye are located is located in the central region of the display panel, and to switch the pixel islands of the display panel to display a super multi-view three-dimensional image when it is determined that the viewing region where the left eye and the right eye are located is located in an edge region of the display panel.

Figure 9:
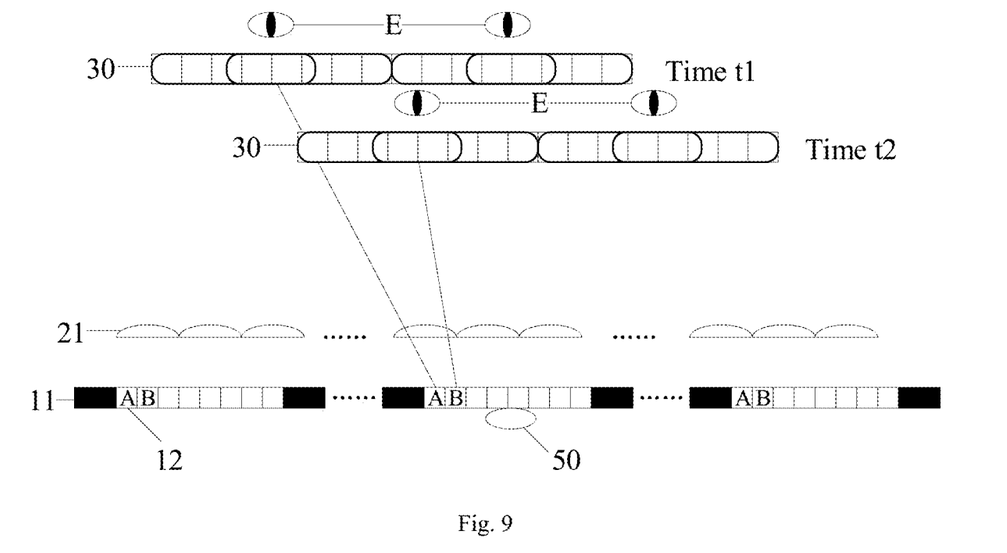
FIG. 9 is a schematic diagram of a display device in a light field display mode according to an embodiment of the present disclosure.

Specifically, when it is determined that the viewing region where the left eye and the right eye are located is located in the central region of the display panel, as shown in FIG. 9, the sub-pixel subdivision unit 12 in all the pixel islands 11 may be driven to display different monocular view images. That is, the plurality of view images in the pixel islands 11 are driven to be displayed in a full gray scale mode, a light field image having a certain depth adjustable is rendered and displayed. For example, in FIG. 9, at time T2, compared with time T1, the independent visible regions 30 where the left eye and the right eye are located move rightwards. It is detected that the viewing regions where the left eye and the right eye are located are both in the central region of the display panel at times T1 and T2, then it may be determined that a light field image viewed by the left eye originates from a sub-pixel subdivision unit A according to the independent visible regions 30 where the left eye and the right eye are located detected at time T1, and it may be determined that a light field image viewed by the left eye originates from a sub-pixel subdivision unit B according to the independent visible regions 30 where the left eye and the right eye are located detected at time T2.

Figure 8:
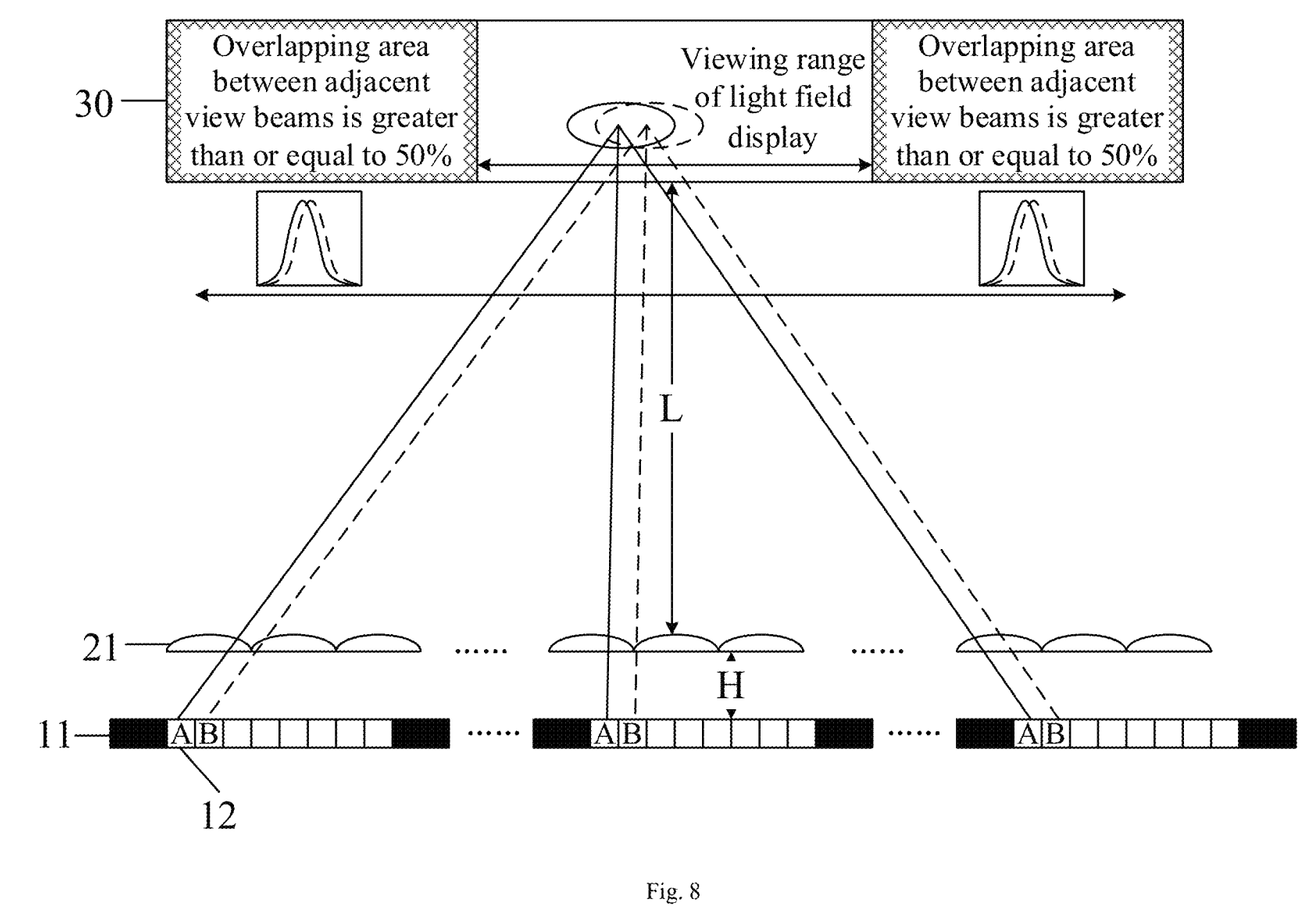
FIG. 8 is a schematic diagram of crosstalk of a display device in a light field display mode according to an embodiment of the present disclosure.

As shown in FIG. 8, viewing a light field image in an edge region has large crosstalk. That is, when an overlapping area between adjacent view beams is greater than or equal to 50%, an effect of viewing the light field image is poor. Thus, when it is determined that the viewing region where the left eye and the right eye are located is located in the edge region of the display panel, an image rendering mode of the display panel 10 may be adjusted. The sub-pixel subdivision unit 12 in each of the pixel islands 11 only opens view information corresponding to the left eye and the right eye, that is, when the left eye and the right eye are away from the central region, independent visible regions where the left eye and the right eye are located are determined by tracking and positioning coordinates of the left eye and the right eye in a spatial region, and left eye view image information and right eye view image information at the position corresponding to a spatial three-dimensional image are switched.

Figure 10:
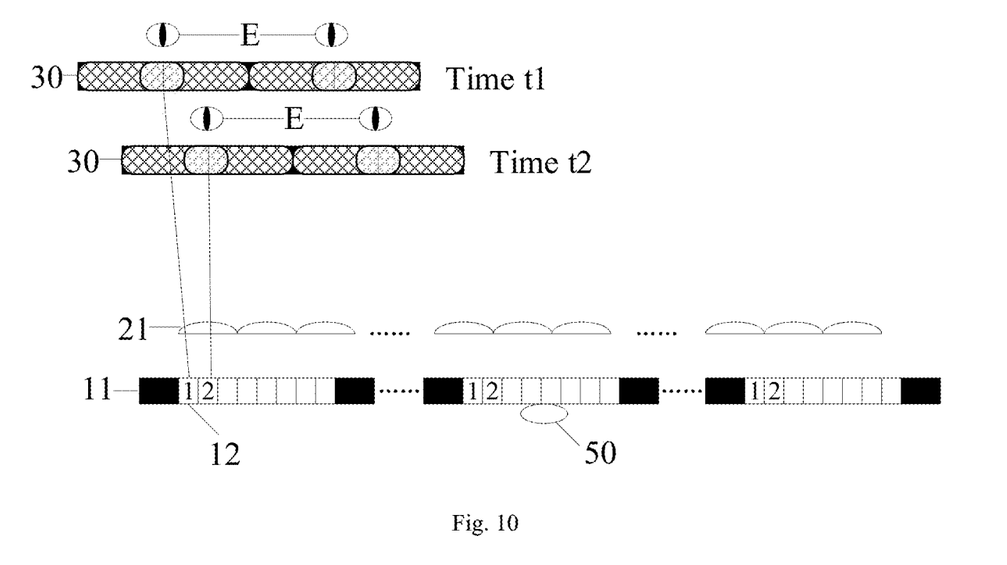
FIG. 10 is a schematic diagram of a display device in a super multi-view three-dimensional (3D) display mode according to an embodiment of the present disclosure.

Optionally, in the display device provided in the embodiment of the present disclosure, the image processor 50 is specifically configured to control, when it is determined that the viewing region where the left eye and the right eye are located is located in the edge region of the display panel, as shown in FIG. 10, sub-pixel subdivision units 12 corresponding to views in the two independent visible regions 30 where the left eye and the right eye of the viewer are located to display the left eye view image and the right eye view image respectively. In order to reduce the crosstalk of the left eye and the right eye, remaining sub-pixel subdivision units 12 may be controlled to display a black gray scale image, so as to achieve low-crosstalk super multi-view 3D display outside the central region. For example, in FIG. 10, at time T2, compared with time T1, the independent visible regions 30 where the left eye and the right eye are located move rightwards. When it is detected that the viewing region where the left eye and the right eye are located are both in the edge region of the display panel at times T1 and T2, according to the independent viewing regions 30 where the left eye and the right eye are located detected at time T1, a corresponding sub-pixel subdivision unit A may be driven to display a left eye view image and a right eye view image, and remaining sub-pixel subdivision units display a black picture. According to the independent viewing regions 30 where the left eye and the right eye are located detected at time T2, a corresponding sub-pixel subdivision unit B may be driven to display a left eye view image and a right eye view image, and remaining sub-pixel subdivision units display a black picture.

Specifically, in the display device provided in the embodiment of the present disclosure, the eye tracker 40 may include a camera located below the central region of the display panel 10. For example, a viewing region where human eyes are located is captured by means of a charge coupled device (CCD) camera.

Optionally, in the display device provided in the embodiment of the present disclosure, the eye tracker 40 may be specifically configured to determine whether the viewing region where the left eye and the right eye are located is located in a space in which an included angle between the viewing region and a center line of the display panel 10 is within 15°. If the viewing region is located in the space, it can be construed as that the viewing region where the left eye and the right eye are located is located in the central region of the display panel, and if the viewing region is not located in the space, it can be construed as that the viewing region where the left eye and the right eye are located is located in the edge region of the display panel.

Specifically, it may be computed whether the viewing region where the left eye and the right eye of the viewer are located is located in the central region of the display panel according to a distance between the independent visible regions 30 and the light splitting device 20, that is, a conventional viewing distance. For example, when the distance between the independent visible regions and the light splitting device is set to be 540 mm, by means of computation, it may be determined that the viewing region where the left eye and the right eye are located is located in the central region of the display panel when the viewing region where the left eye and the right eye are located is within a range of 60 mm around the center line of the display panel; and it may be determined that the viewing region where the left eye and the right eye are located is located in the edge region of the display panel when the viewing region where the left eye and the right eye are located is beyond 60 mm from the center line of the display panel.

Based on the same inventive concept, an embodiment of the present disclosure further provides a driving method for the display device. The principle for solving a problem of the method is similar to that of the display device, such that reference may be made to the embodiments of the display device for the implementation of the driving method, which is not repeated herein.

Figure 11:
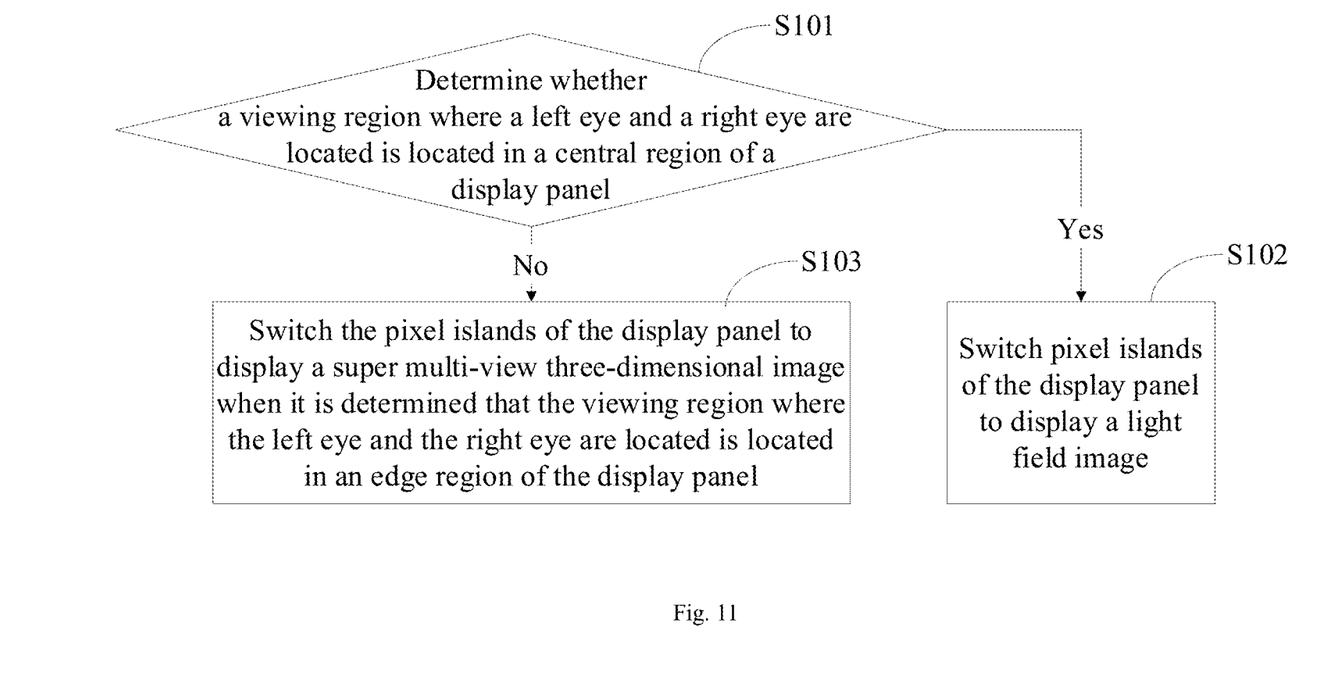
FIG. 11 is a schematic flowchart of a driving method according to an embodiment of the present disclosure.

An embodiment of the present disclosure provides a driving method for the display device. As shown in FIG. 11. The method may specifically include the following operations.

S101, determine whether a viewing region where a left eye and a right eye are located is located in a central region of a display panel, where for example, the viewing region where human eyes are located may be obtained by means of a CCD camera.

S102, switch pixel islands of the display panel to display a light field image when it is determined that the viewing region where the left eye and the right eye are located is located in the central region of the display panel, where the sub-pixel subdivision unit 12 in all the pixel islands 11 may be driven to display different monocular view images, that is, the plurality of view images in the pixel islands 11 are driven to be displayed in a full gray scale mode, a light field image having a certain depth adjustable is rendered and displayed.

S103, switch the pixel islands of the display panel to display a super multi-view three-dimensional image when it is determined that the viewing region where the left eye and the right eye are located is located in an edge region of the display panel, where viewing a light field image in an edge region has large crosstalk, that is, when an overlapping area between adjacent view beams is greater than or equal to 50%, an effect of viewing the light field image is poor. Thus, when it is determined that the viewing region where the left eye and the right eye are located is located in the edge region of the display panel, an image rendering mode of the display panel 10 may be adjusted. The sub-pixel subdivision unit 12 in each of the pixel islands 11 only opens view information corresponding to the left eye and the right eye, that is, when the left eye and the right eye are away from the central region, independent visible regions where the left eye and the right eye are located are determined by tracking and positioning coordinates of the left eye and the right eye in a spatial region, and left eye view image information and right eye view image information at the position corresponding to a spatial three-dimensional image are switched.

Specifically, when it is determined that the viewing region where the left eye and the right eye are located is located in an edge region of the display panel, S103 may specifically include: control sub-pixel subdivision units corresponding to views in two independent visible regions where the left eye and the right eye of the viewer are located to display a left eye view image and a right eye view image respectively, and control remaining sub-pixel subdivision units to display a black gray scale image.

Specifically, when it is determined that the viewing region where the left eye and the right eye are located is located in the edge region of the display panel, sub-pixel subdivision units 12 corresponding to views in the two independent visible regions 30 where the left eye and the right eye of the viewer are located may be controlled to display the left eye view image and the right eye view image respectively. In order to reduce the crosstalk of the left eye and the right eye, remaining sub-pixel subdivision units 12 may be controlled to display a black gray scale image, so as to achieve low-crosstalk super multi-view 3D display outside the central region.

Specifically, S101 of determining whether a viewing region where a left eye and a right eye are located is located in a central region of a display panel may specifically include: determine whether the viewing region where the left eye and the right eye are located is located in a space in which an included angle between the viewing region and a center line of the display panel is within 15°.

Specifically, it may be computed whether the viewing region where the left eye and the right eye of the viewer are located is located in the central region of the display panel according to a distance between the independent visible regions 30 and the light splitting device 20, that is, a conventional viewing distance. For example, when the distance between the independent visible regions and the light splitting device is set to be 540 mm, by means of computation, it may be determined that the viewing region where the left eye and the right eye are located is located in the central region of the display panel when the viewing region where the left eye and the right eye are located is within a range of 60 mm around the center line of the display panel; and it may be determined that the viewing region where the left eye and the right eye are located is located in the edge region of the display panel when the viewing region where the left eye and the right eye are located is beyond 60 mm from the center line of the display panel.

While the preferred embodiments of the present disclosure have been described, additional alterations and modifications to those embodiments may be made by those skilled in the art once the basic inventive concept is apparent to those skilled in the art. Thus, the appended claims are intended to be interpreted to include the preferred embodiments and all alterations and modifications that fall within the scope of the present disclosure.

It will be apparent to those skilled in the art that various modifications and variations can be made to the embodiments of the present disclosure without departing from the spirit and scope of the embodiments of the present disclosure. Thus, if modifications and variations to the embodiments of the present disclosure fall within the scope of the appended claims of the present disclosure and their equivalents, the present disclosure is intended to include such modifications and variations as well.

What is claimed is:

1. A display device, comprising:
    a display panel comprising a plurality of pixel islands, wherein each of the pixel islands comprises a plurality of sub-pixels arranged in an array, the plurality of sub-pixels in each of the pixel islands are divided into a plurality of sub-pixel subdivision units arranged in a row direction, each of the sub-pixel subdivision units is configured to display a monocular view image, and the sub-pixel subdivision units in one pixel island are configured to alternately display a left eye view image and a right eye view image in the row direction; and
    a light splitting device on a side of a display surface of the display panel, and comprising a plurality of lenses arranged in an array, wherein one pixel island corresponds to one lens, a main lobe angle of each of the lenses satisfies that monocular view images displayed by the sub-pixel subdivision units in one pixel island are projected onto a corresponding independent visible region by means of different lenses to form a view separately, a quantity of views comprised in one independent visible region is not less than 2, and a width of each view in the row direction formed by projecting the monocular view image displayed by each of the sub-pixel subdivision units onto the independent visible region by means of the lens is less than a monocular pupil diameter;
    wherein the lenses are columnar lenses, and a diameter of one lens is less than a width of one pixel island in the row direction; and
    a central point of the pixel island at a central position of the display panel and a central point of the corresponding lens coincide with each other, and the lenses of the light splitting device are ranged closely.

2. The display device according to claim 1, wherein the diameter P of each of the lenses and the width D of the pixel island in the row direction satisfy the following relation:

$$\frac{P}{D} = \frac{L}{L+H};$$

wherein L represents a distance between the independent visible region and the light splitting device, and H represents a distance between the pixel island and the lens.

3. The display device according to claim 2, wherein the width of each view in the row direction formed by projecting the monocular view image displayed by each of the sub-pixel subdivision units onto the independent visible region by means of the lens is less than or equal to 3.2 mm, and a curvature radius of each of the lenses ranges from 1.86 mm to 2.02 mm.

4. The display device according to claim 1, wherein the left eye view image and the right eye view image displayed by two sub-pixel subdivision units respectively are projected onto two independent visible regions respectively where a left eye and a right eye of a viewer are located by means of adjacent lenses.

5. The display device according to claim 1, wherein the left eye view image and the right eye view image displayed by two sub-pixel subdivision units respectively are projected onto two independent visible regions respectively where a left eye and a right eye of a viewer are located by means of two lenses separated by n lenses, and n is greater than or equal to 1 and is an integer.

6. The display device according to claim 5, wherein a width Q of the independent visible region in the row direction and a pupil distance E between the left eye and the right eye of the viewer satisfy the following relation:

$$Q = \frac{E}{2n+1};$$

wherein Q≥8 mm, n represents a quantity of lenses separating the two lenses through which the left eye view image and the right eye view image displayed by the two sub-pixel subdivision units respectively are projected onto the left eye and the right eye of the viewer respectively, and E has a value range of 58 mm-78 mm.

7. The display device according to claim 6, wherein a quantity k of the sub-pixel subdivision units in one pixel island and the width Q of the independent visible region in the row direction satisfy the following relation:

$$Q = k\frac{e}{2m};$$

wherein m represents the quantity of views comprised in one independent visible region, m≥2; and e represents the monocular pupil diameter, and has a value range of 3 mm-5 mm.

8. The display device according to claim 1, further comprising:
   an eye tracker configured to determine whether a viewing region where the left eye and the right eye are located is located in a central region of the display panel; and
   an image processor configured to switch the pixel islands of the display panel to display a light field image in response to that the viewing region where the left eye and the right eye are located is located in the central region of the display panel, and to switch the pixel islands of the display panel to display a super multi-view three-dimensional image in response to that the viewing region where the left eye and the right eye are located is located in an edge region of the display panel.

9. The display device according to claim 8, wherein the image processor is further configured to control, in response to that the viewing region where the left eye and the right eye are located is located in the edge region of the display panel, sub-pixel subdivision units corresponding to views in the two independent visible regions where the left eye and the right eye of the viewer are located to display the left eye view image and the right eye view image respectively, and to control remaining sub-pixel subdivision units to display a black gray scale image.

10. The display device according to claim 8, wherein the eye tracker is further configured to determine whether the viewing region where the left eye and the right eye are located is located in a space in which an included angle between the viewing region and a center line of the display panel is within 15°.

11. The display device according to claim 8, wherein the eye tracker comprises a camera below the central region of the display panel.

12. A driving method for the display device according to claim 1, comprising:
   determining whether a viewing region where a left eye and a right eye are located is located in a central region of a display panel; and
   switching pixel islands of the display panel to display a light field image in response to that the viewing region where the left eye and the right eye are located is located in the central region of the display panel; and
   switching the pixel islands of the display panel to display a super multi-view three-dimensional image in response to that the viewing region where the left eye and the right eye are located is located in an edge region of the display panel.

13. The driving method according to claim 12, wherein in response to that the viewing region where the left eye and the right eye are located is located in the edge region of the display panel, the method further comprises:
   controlling sub-pixel subdivision units corresponding to views in two independent visible regions where the left eye and the right eye of the viewer are located to display a left eye view image and a right eye view image respectively, and controlling remaining sub-pixel subdivision units to display a black gray scale image.

14. The driving method according to claim 12, wherein the determining whether the viewing region where the left eye and the right eye are located is located in the central region of the display panel further comprises:
   determining whether the viewing region where the left eye and the right eye are located is located in a space in which an included angle between the viewing region and a center line of the display panel is within 15°.

15. The display device according to claim 2, further comprising:
   an eye tracker configured to determine whether a viewing region where the left eye and the right eye are located is located in a central region of the display panel; and
   an image processor configured to switch the pixel islands of the display panel to display a light field image in response to that the viewing region where the left eye and the right eye are located is located in the central region of the display panel, and to switch the pixel islands of the display panel to display a super multi-view three-dimensional image in response to that the viewing region where the left eye and the right eye are located is located in an edge region of the display panel.

16. The display device according to claim 3, further comprising:
   an eye tracker configured to determine whether a viewing region where the left eye and the right eye are located is located in a central region of the display panel; and
   an image processor configured to switch the pixel islands of the display panel to display a light field image in response to that the viewing region where the left eye and the right eye are located is located in the central region of the display panel, and to switch the pixel islands of the display panel to display a super multi-view three-dimensional image in response to that the viewing region where the left eye and the right eye are located is located in an edge region of the display panel.

17. The display device according to claim 4, further comprising:
   an eye tracker configured to determine whether a viewing region where the left eye and the right eye are located is located in a central region of the display panel; and
   an image processor configured to switch the pixel islands of the display panel to display a light field image in response to that the viewing region where the left eye and the right eye are located is located in the central region of the display panel, and to switch the pixel islands of the display panel to display a super multi-view three-dimensional image in response to that the viewing region where the left eye and the right eye are located is located in an edge region of the display panel.

18. The driving method according to claim 13, wherein the determining whether the viewing region where the left eye and the right eye are located is located in the central region of the display panel further comprises:
   determining whether the viewing region where the left eye and the right eye are located is located in a space in which an included angle between the viewing region and a center line of the display panel is within 15°.

19. A display device, comprising:
   a display panel comprising a plurality of pixel islands, wherein each of the pixel islands comprises a plurality of sub-pixels arranged in an array, the plurality of sub-pixels in each of the pixel islands are divided into a plurality of sub-pixel subdivision units arranged in a row direction, each of the sub-pixel subdivision units is configured to display a monocular view image, and the sub-pixel subdivision units in one pixel island are configured to alternately display a left eye view image and a right eye view image in the row direction; and
   a light splitting device on a side of a display surface of the display panel, and comprising a plurality of lenses arranged in an array, wherein one pixel island corresponds to one lens, a main lobe angle of each of the lenses satisfies that monocular view images displayed by the sub-pixel subdivision units in one pixel island are projected onto a corresponding independent visible region by means of different lenses to form a view separately, a quantity of views comprised in one independent visible region is not less than 2, and a width of each view in the row direction formed by projecting the monocular view image displayed by each of the sub-pixel subdivision units onto the independent visible region by means of the lens is less than a monocular pupil diameter;

wherein the left eye view image and the right eye view image displayed by two sub-pixel subdivision units respectively are projected onto two independent visible regions respectively where a left eye and a right eye of a viewer are located by means of two lenses separated by n lenses, and n is greater than or equal to 1 and is an integer; and a width Q of the independent visible region in the row direction and a pupil distance E between the left eye and the right eye of the viewer satisfy the following relation:

$$Q = \frac{E}{2n+1};$$

wherein Q≥8 mm, n represents a quantity of lenses separating the two lenses through which the left eye view image and the right eye view image displayed by the two sub-pixel subdivision units respectively are projected onto the left eye and the right eye of the viewer respectively, and E has a value range of 58 mm-78 mm.

20. A display device, comprising:
a display panel comprising a plurality of pixel islands, wherein each of the pixel islands comprises a plurality of sub-pixels arranged in an array, the plurality of sub-pixels in each of the pixel islands are divided into a plurality of sub-pixel subdivision units arranged in a row direction, each of the sub-pixel subdivision units is configured to display a monocular view image, and the sub-pixel subdivision units in one pixel island are configured to alternately display a left eye view image and a right eye view image in the row direction;

a light splitting device on a side of a display surface of the display panel, and comprising a plurality of lenses arranged in an array, wherein one pixel island corresponds to one lens, a main lobe angle of each of the lenses satisfies that monocular view images displayed by the sub-pixel subdivision units in one pixel island are projected onto a corresponding independent visible region by means of different lenses to form a view separately, a quantity of views comprised in one independent visible region is not less than 2, and a width of each view in the row direction formed by projecting the monocular view image displayed by each of the sub-pixel subdivision units onto the independent visible region by means of the lens is less than a monocular pupil diameter;

an eye tracker configured to determine whether a viewing region where the left eye and the right eye are located is located in a central region of the display panel; and an image processor configured to switch the pixel islands of the display panel to display a light field image in response to that the viewing region where the left eye and the right eye are located is located in the central region of the display panel, and to switch the pixel islands of the display panel to display a super multi-view three-dimensional image in response to that the viewing region where the left eye and the right eye are located is located in an edge region of the display panel;

wherein the eye tracker is further configured to determine whether the viewing region where the left eye and the right eye are located is located in a space in which an included angle between the viewing region and a center line of the display panel is within 15°.

\* \* \* \* \*